(12) United States Patent
Park et al.

(10) Patent No.: US 10,180,116 B2
(45) Date of Patent: Jan. 15, 2019

(54) HEAT MEDIUM CIRCULATION STRUCTURE AND HOT WATER TEMPERATURE CONTROL METHOD FOR MICRO COMBINED HEAT AND POWER GENERATOR

(71) Applicant: KYUNGDONG NAVIEN CO., LTD, Pyeongtaek-si, Gyeonggi-do (KR)

(72) Inventors: Dae Woong Park, Incheon (KR); Duck Pyo Jang, Seoul (KR)

(73) Assignee: KYUNGDONG NAVIEN CO., LTD, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/322,057

(22) PCT Filed: Jun. 10, 2015

(86) PCT No.: PCT/KR2015/005817
§ 371 (c)(1),
(2) Date: Dec. 23, 2016

(87) PCT Pub. No.: WO2015/199359
PCT Pub. Date: Dec. 30, 2015

(65) Prior Publication Data
US 2017/0138300 A1 May 18, 2017

(30) Foreign Application Priority Data

Jun. 27, 2014 (KR) .......................... 10-2014-0080292

(51) Int. Cl.
*F02G 1/047* (2006.01)
*F24H 1/18* (2006.01)
(Continued)

(52) U.S. Cl.
CPC ............. *F02G 1/047* (2013.01); *F02G 1/055* (2013.01); *F24H 1/186* (2013.01); *F24H 9/2007* (2013.01);
(Continued)

(58) Field of Classification Search
CPC ...... F02G 1/047; F02G 1/055; F02G 2243/00; F24H 1/186; F24H 9/2007; F24H 2240/04; F24H 8/00; Y02E 20/14
(Continued)

(56) References Cited

U.S. PATENT DOCUMENTS 6,393,775 B1 * 5/2002 Staschik ................... C02F 9/00
210/170.08
7,040,544 B2 * 5/2006 Guyer ....................... F24D 5/02
237/12.1
(Continued)

FOREIGN PATENT DOCUMENTS

DE 19936591 C1 2/2001
DE 10244343 A1 4/2004
(Continued)

*Primary Examiner* — Hoang Nguyen
(74) *Attorney, Agent, or Firm* — Novick, Kim & Lee, PLLC; Jae Youn Kim

(57) ABSTRACT

The present invention provides a heat medium circulation structure for a micro-combined heat and power (micro-CHP) generator in which a heat medium that primarily looses heat by undergoing heat exchange with water in a hot-water tank and thus has a low temperature further performs heat exchange with low-temperature direct water supplied through a direct water line, thereby further loosing heat, in a return line heat exchanger, and then returns to a stirling engine through a heat medium return line, thereby effectively cooling a low temperature portion of the stirling engine. Thus, the heat medium circulation structure enables high electricity production efficiency. Further provided is a hot water temperature control method for a micro-CHP (Continued)

generator in which the consumption of hot water is detected by a flow sensor. First and second predetermined temperatures are defined to operate a stirling engine in the case of temperature droppings of hot water respectively due to natural radiation and consumption of hot water.

4 Claims, 5 Drawing Sheets

(51) Int. Cl.
*F02G 1/055* (2006.01)
*F24H 9/20* (2006.01)
*F24H 8/00* (2006.01)

(52) U.S. Cl.
CPC ............ *F02G 2243/00* (2013.01); *F24H 8/00* (2013.01); *F24H 2240/04* (2013.01); *Y02E 20/14* (2013.01)

(58) Field of Classification Search
USPC .................................................. 60/517–526
See application file for complete search history.

(56) References Cited

U.S. PATENT DOCUMENTS

| | | | |
|---|---|---|---|
| 2002/0158530 A1* | 10/2002 | Gennesseaux | ........ F24D 11/005 310/112 |
| 2002/0189173 A1* | 12/2002 | Staschik | ................... C02F 9/00 52/79.1 |
| 2010/0038441 A1* | 2/2010 | Pedersen | ............. F24D 11/0221 237/2 B |
| 2010/0230088 A1* | 9/2010 | Clark | ........................ F24H 1/00 165/287 |

FOREIGN PATENT DOCUMENTS

| | | |
|---|---|---|
| EP | 2420756 A1 | 2/2012 |
| GB | 2444944 A | 6/2008 |
| JP | 2002-013811 A | 1/2002 |
| JP | 3902984 B2 | 4/2007 |
| KR | 20-0307728 Y1 | 3/2003 |
| KR | 10-2012-0016933 A | 9/2012 |
| KR | 10-1183815 B1 | 9/2012 |
| WO | 0190656 A1 | 11/2001 |

* cited by examiner

HEAT MEDIUM CIRCULATION STRUCTURE AND HOT WATER TEMPERATURE CONTROL METHOD FOR MICRO COMBINED HEAT AND POWER GENERATOR

TECHNICAL FIELD

The present invention relates to a heat medium circulation structure and a hot water temperature control method for a micro-combined heat and power (micro-CHP) generator. More particularly, the present invention relates to a heat medium circulation structure and a hot water temperature control method for a micro-CHP, in which a return line heat exchanger is disposed at one side of a direct water line so that direct water introduced through the direct water line may not be directly supplied to a hot water tank but be supplied after undergoing primary heat exchange with a heat medium in a heat medium return line.

BACKGROUND ART

Recently, the demand for finding alternative energies has increased and thus there is a growing interest in the technology of recovering latent heat from low-temperature exhaust gas or coolant and of recycling it.

In this regard, a stirling engine is used to convert low- or medium-temperature heat energy into shaft power (high quality energy). A stirling engine is advantageous in that it has a very simple structure and is operated in an easy way because all the elements thereof involved in the Rankine cycle are integrated into one engine and gas such as air is used as a working fluid.

In addition, a stirling engine has the highest heat efficiency among systems using the Rankine cycle. Therefore, when converting low- or medium-temperature heat energy into work, the use of the stirling engine is advantageous in terms of its relatively simple structure and high energy conversion efficiency compared to conventional Rankin-cycle systems.

As illustrated in FIG. 1, recently a micro-combined heat and power (micro-CHP) generator that is a power generation system capable of generating electricity and heat using a stirling engine has been domestically used. Such a micro-CHP is a kind of a boiler system for domestic use and it includes a stirling engine 110 and an auxiliary boiler 200, in which the stirling engine 110 generates electricity and the auxiliary boiler 200 generates hot water for heating.

A high-temperature heat medium, supplied via a sensible heat exchanger 210 and a latent heat exchanger 220 included in the auxiliary boiler 200, undergoes heat exchange with low-temperature water in a hot water tank 300 to produce hot water and thus becomes a low-temperature heat medium by losing heat through the heat exchange. The hot water is stored in the hot water tank and then consumed by a user. The low-temperature heat medium produced through the heat exchange performed in the hot water tank 300 returns to the stirling engine through a heat medium return line 130 to cool down the stirling engine 110. The low-temperature heat medium sequentially passes again the latent heat exchanger 220 and the sensible heat exchanger 210 to become a high-temperature heat medium by gaining heat from the sensible and latent heat exchangers after passing through the stirling engine 110. In this way, the heat medium circulates and repeatedly undergoes this heat exchange cycle.

In the stirling engine 110, when an engine head (not shown) is heated, a working fluid (for example, hydrogen gas or helium gas) in the engine head expands and contracts due to a temperature difference and thus generates alternating current. As the difference in temperature between a high temperature portion that is the engine head heated by an engine burner 120 and a low temperature portion that is a portion to which the heat medium returns is increased, an amount of electricity generated is increased.

The hot water tank 300 is provided with a temperature sensor 310 to turn on the micro-CHP when the temperature of the hot water in the hot water tank is lowered to below a predetermined temperature, so that the hot water tank 300 can normally store hot water having a temperature in the range of 50° C. to 60° C. In addition, when a certain amount of hot water is consumed, water is externally supplied to the hot water tank through a direct water line by an amount equal to the consumed amount, so the water in the hot water tank is replenished. Thus, the water in the hot water tank can be maintained at a predetermined level.

However, when the hot water in the hot water tank is consumed by a user, the stirling engine is operated and thus the water in the hot water tank 300 is heated up to a temperature in the range of 55 to 65° C. At this point, the temperature of the heat medium that returns to the stirling engine through the heat medium return line 130 may normally reach a temperature in the range of 60 to 70°.

In this case, since the temperature of the low temperature portion of the stirling engine 110 is increased by the heat medium that returns through the heat medium return line 130, there is a problem that an amount of electricity that is produced is decreased.

Furthermore, the operation of the stirling engine 110 is partially or entirely restrained when the temperature of the returning heat medium is 60° C. or higher so that the stirling engine can be protected from the thermal shock caused by the high-temperature heat medium that returns to the stirling engine. Thus, the stirling engine 110 repeatedly stops and resumes operating in accordance with the temperature of the low temperature portion of the stirling engine 110, which is likely to result in durability deterioration. Therefore, it is difficult to expect a trouble-free operation of the stirling engine.

DISCLOSURE

Technical Problem

Accordingly, the present invention has been made keeping in mind the above problems occurring in the prior art, and an object of the present invention is to provide a heat medium circulation structure for a micro-combined heat and power (micro-CHP) generator, in which a heat medium that has primarily lost its heat through heat exchange performed in a hot water tank performs heat exchange with low-temperature direct water introduced through a direct water line, in a return line heat exchanger and afterward returns to a stirling engine through a heat medium return line, thereby lowering the temperature of a low temperature portion of the stirling engine, which helps in maintaining high electricity production efficiency.

Another object of the present invention is to provide a hot water temperature control method for a micro-CHP generator, in which the use of hot water is detected by a flow sensor disposed at one side of a direct water line. In the method, defined are a first predetermined temperature and a second predetermined temperature used as reference values to operate a stirling engine respectively for the case of temperature dropping due to natural radiation and for the case of temperature dropping due to the use of hot water. This method prevents durability deterioration of the stirling engine attributable to frequent operation stops and resumptions of the stirling engine.

Technical Solution

In order to accomplish the above object(s), the present invention provides a heat medium circulation structure for a micro-combined heat and power (micro-CHP) generator, the structure including: a stirling engine that produces electricity using a temperature difference between a high temperature of an engine head that is heated by an engine burner and a low temperature of a heat medium which returns from a hot water tank through a heat medium return line; a sensible heat exchanger disposed at one side of the stirling engine; the hot water tank that receives the heat medium which is heated to a high temperature by the stirling engine and the sensible heat exchanger and is then supplied thereto through a heat medium supply line, and allows the high-temperature heat medium to perform heat-exchange with water stored therein; and a direct water line through which direct water is supplied to the hot water tank to replenish the water stored in the hot water tank so that the hot water tank maintains a predetermined water level, the direct water passing through a return line heat exchanger that performs heat exchange with the heat medium in the heat medium return line.

The heat medium circulation structure may further include a latent heat exchanger disposed at one side of the stirling engine, wherein the hot water tank receives the heat medium that is heated by passing the stirling engine, the sensible heat exchanger, and the latent heat exchanger and allows the heat medium to undergo heat exchange with the water stored therein.

The heat medium circulation structure may further include a circulation pump disposed between the return line heat exchanger and the stirling engine to adjust a flow rate M of the heat medium that circulates and performs heat exchange with the direct water, in the return line heat exchanger, so that a temperature of the heat medium supplied from the stirling engine is adjusted.

In order to accomplish the above object(s), according to another aspect, there is provided a hot water temperature control method for a micro-combined heat and power generator, the method including: determining whether hot water is consumed by sensing a flow rate of direct water introduced into a hot water tank, using a flow sensor, during operation of the micro-combined heat and power generator; determining whether a temperature T of the hot water stored in the hot water tank is lower than a second predetermined temperature B (which is a preset reference temperature used to operate a stirling engine in the case of temperature dropping due to consumption of hot water) when it is determined that the hot water is consumed; determining whether the temperature T of the hot water stored in the hot water tank is lower than a first predetermined temperature A (which is a preset reference temperature used to operate the sterling engine in the case of temperature dropping due to natural radiation) when it is determined that the hot water is not consumed; operating the stirling engine when it is determined that the temperature T of the hot water is lower than the second predetermined temperature B or the first predetermined temperature A; adjusting a temperature of the heat medium supplied from the stirling engine by adjusting a flow rate M of the heat medium using a circulation pump; determining whether the temperature T of the hot water is lower than a third predetermined temperature C at which the stirling engine needs to stop operating; and stopping the stirling engine that is operating, when it is determined that the temperature T of the hot water is equal to or higher than the third predetermined temperature C.

Advantageous Effects

According to one embodiment of the present invention, a heat medium that returns to a stirling engine performs heat exchange with low-temperature direct water introduced through a direct water line, in a return line heat exchanger, thereby losing its heat and thus cooling down a low temperature portion of the stirling engine, which enables high electricity production efficiency.

In addition, by defining two temperatures as reference values to operate a stirling engine respectively for the case in which hot water is cooled due to natural radiation and for the case in which water is replenished due to consumption of hot water, it is possible to prevent durability deterioration of the stirling engine attributable to frequent operation stops and resumptions of the stirling engine, and thus it is possible to expect a trouble-free operation of the stirling engine.

MODE FOR INVENTION

Hereinafter, preferred embodiments of the present invention will be described below with reference to the accompanying drawings.

Figure 1:
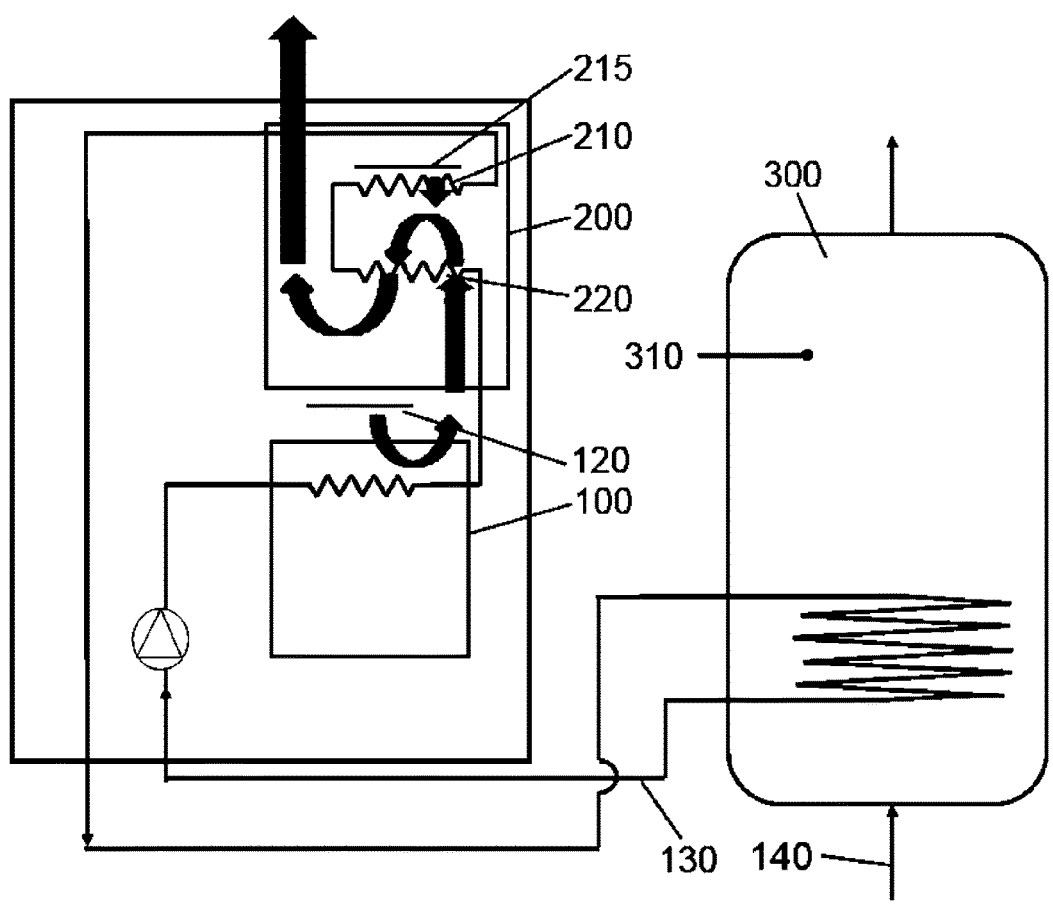
FIG. 1 is a schematic diagram illustrating an exhaust structure and a heat medium circulation structure for a micro-combined heat and power (micro-CHP) generator according to a related art.
Figure 2:
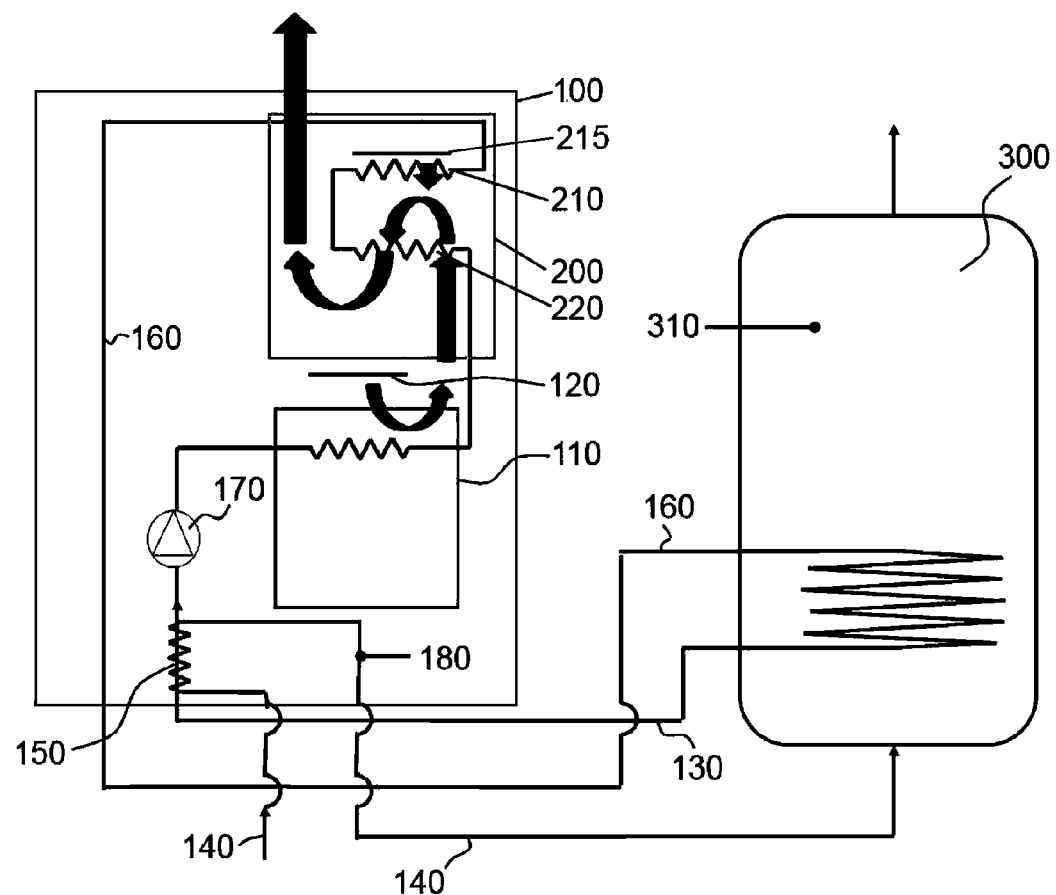
FIG. 2 is a schematic diagram illustrating an exhaust structure and a heat medium circulation structure for a micro-combined heat and power (micro-CHP) generator according to one embodiment of the present invention.
Figure 3:
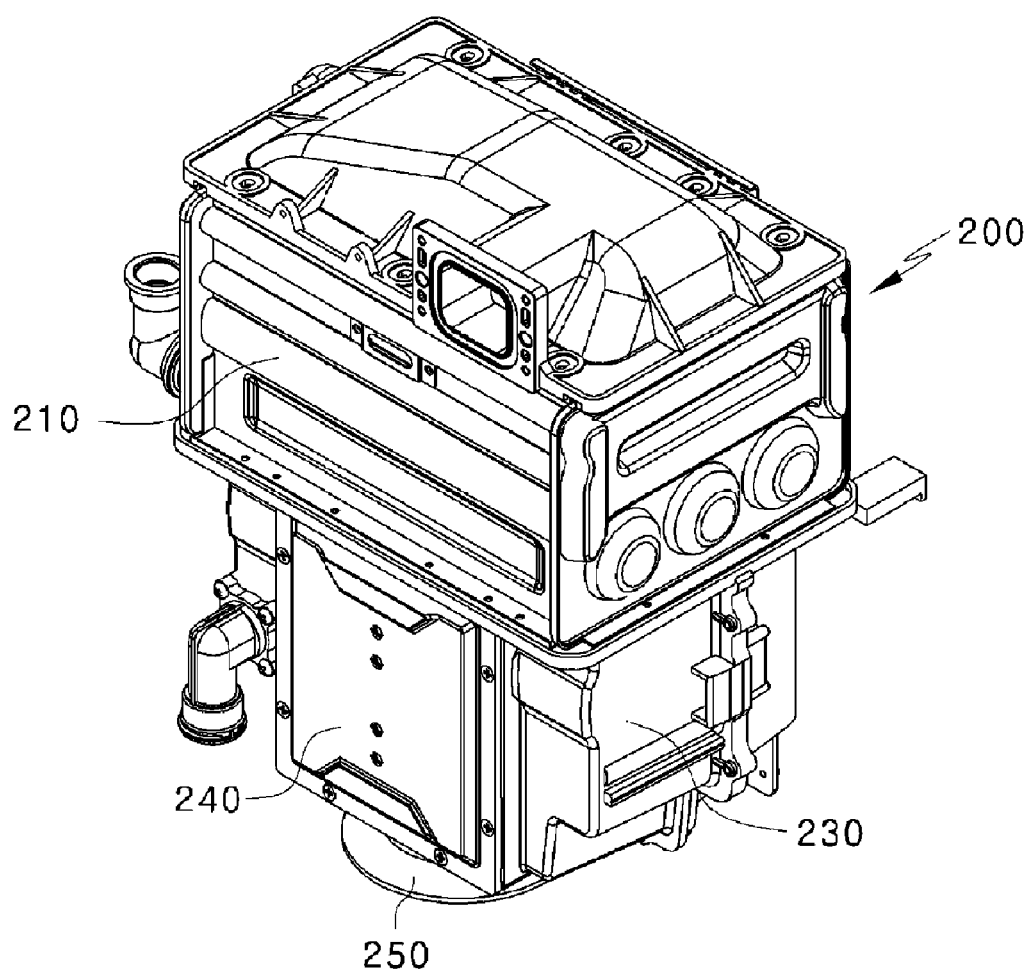
FIG. 3 is a perspective view illustrating a main portion of an auxiliary boiler according to the embodiment of the present invention.
Figure 4:
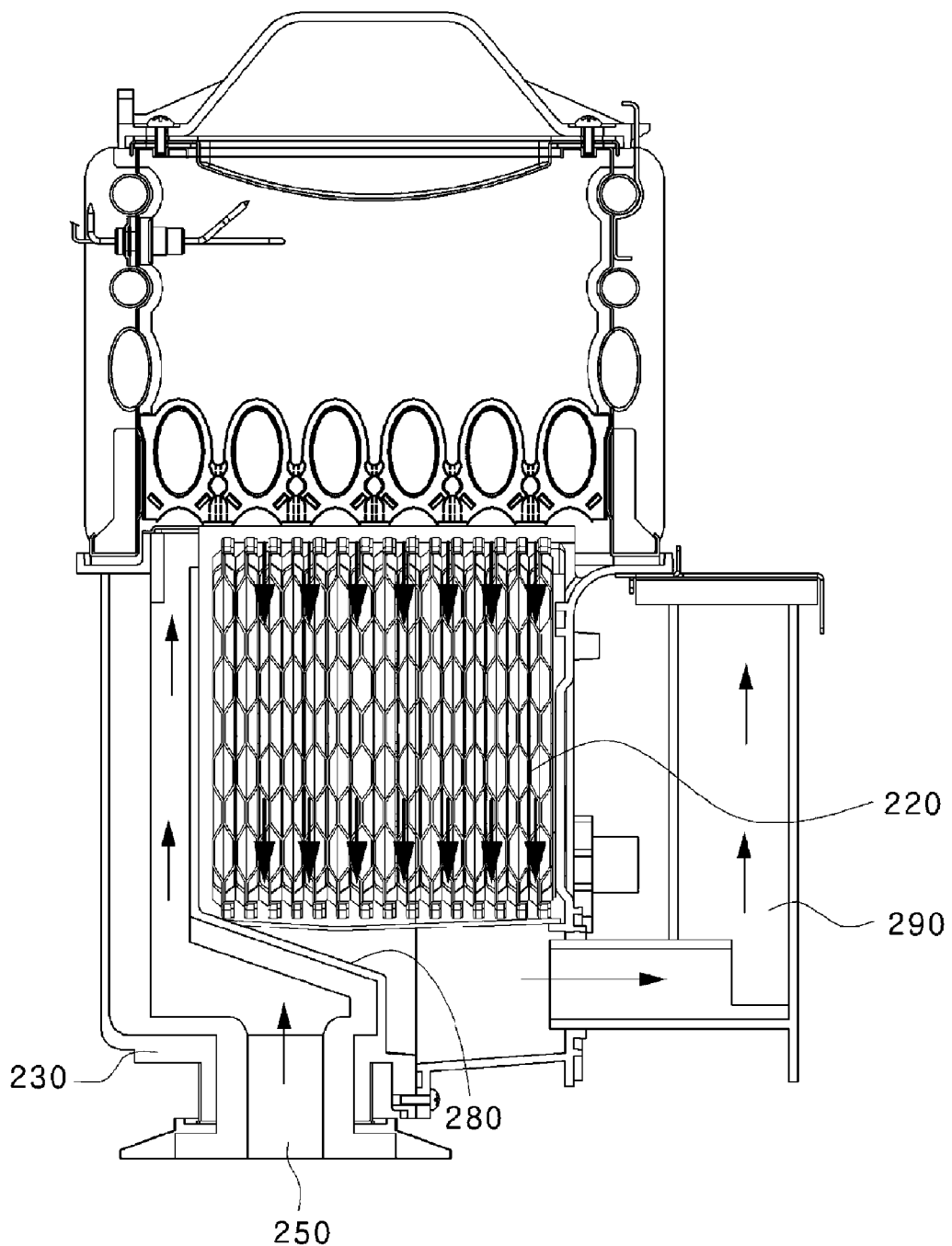
FIG. 4 is a combination of a front view and a cross-sectional view illustrating an exhaust air duct of the auxiliary boiler according to the embodiment of the present invention.

As illustrated in FIGS. 2 to 4, a micro-combined heat and power (micro-CHP) generator according to one embodiment of the present invention includes a housing 100, a stirling engine 110 disposed in the housing 100, and an auxiliary boiler 200 disposed above the stirling engine 110.

The auxiliary boiler 200 includes a casing 230, a latent heat exchanger 220 disposed in the casing 230, and a sensible heat exchanger 210 disposed above the casing 230.

The casing 230 is partially open in the front side, and the opening formed in the front is covered and sealed by a cover 240, thereby forming a channel used for discharging the exhaust gas of an engine.

The casing 230 has a hole (not shown) in the bottom and a connection pipe 250 is connected to the hole. The connection pipe 250 is also connected to an engine head of the stirling engine 110. The connection pipe 250 guides the exhaust gas that is generated through combustion by an engine burner 120 and discharged after heating the stirling engine 110. The connection pipe 250 is provided with a flange so that it can be easily coupled to the casing 230.

The exhaust gas discharged from an upper end of the connection pipe 250 is guided to flow over the latent heat exchanger 220 and then to pass the latent heat exchanger 220. After that, the exhaust gas is guided to flow downward and is finally discharged outside the auxiliary boiler.

The stirling engine 110 is operated by a main boiler (not shown). When the engine head (not shown) of the stirling engine 110 is heated by the engine burner 120 of the main boiler, a working fluid in the stirling engine expands and contracts due to a temperature difference, thereby generating alternating current.

A heat medium that is heated by the sensible heat exchanger 210 and the latent heat exchanger 220 of the auxiliary boiler 200 to become a high-temperature heat medium, performs heat exchange with water stored in the hot water tank 300, thereby producing hot water through the heat exchange and becoming a low temperature heat medium.

In this case, the heat medium circulation structure for a micro-CHP generator according to one embodiment of the present invention, returns the low-temperature heat medium that has undergone the heat exchange in the hot water tank 300 to the stirling engine 110 to cool down the stirling engine 110. At this point, the low-temperature heat medium returns to the stirling engine 110 after undergoing heat exchange with low-temperature direct water introduced through a direct water line 140, in a return line heat exchanger 150. Subsequently, after passing the stirling engine 110, the heat medium sequentially passes again the latent heat exchanger 220 and the sensible heat exchanger 210. In this way, the heat medium repeatedly circulates.

The hot water tank 300 is provided with a temperature sensor 310 that senses the temperature of water stored in the hot water tank 300. When the temperature of hot water stored in the hot water tank is lower than a predetermined temperature, the micro-CHP generator starts operating to normally produce 50° C. to 60° C. hot water. When the consumption of hot water is small, the hot water is in a state of equilibrium at a temperature between 50° C. and 60° C. When the hot water is consumed, direct water is supplied to the hot water tank by an amount that corresponds to the consumption through the direct water line 140. Therefore, a predetermined water level is maintained during the use of the hot water.

Meanwhile, direct water is not directly supplied to the hot water tank 300 through the direct water line 140. That is, a return line heat exchanger 150 is disposed at one side of the direct line 140 so that the direct water can primarily perform heat exchange with the heat medium that passes through the heat medium return line 130, in the return line heat exchanger 150, before being supplied to the hot water tank 300.

Therefore, the water supplied to the hot water tank 300 has a moderate temperature by undergoing heat exchange with the heat medium in the return line heat exchanger 150. For this reason, it becomes easier to control the temperature of hot water stored in the hot water tank 300 within a temperature range of 50° to 60° C.

The heat medium returned to the stirling engine 110 through the heat medium return line 130 is further cooled down by undergoing heat exchange with the water introduced through the direct water line 140. Therefore, the returned heat medium can more effectively cool down a low temperature portion of the stirling engine 110, which results in high electricity production efficiency.

The hot water stored in the hot water tank 300 needs to be kept at a high temperature. Therefore, the temperature of the heat medium supplied to the hot water tank 300 through the heat medium supply line 160 needs to be 65° C. or higher, which is generally 5° C. higher than the desired temperature of the hot water. However, when the temperature of the heat medium returned through the heat medium return line 130 is lower than that and the flow rate of the heat medium is high, the heat medium supplied to the hot water tank 300 through the heat medium supply line 160 is difficult to maintain a sufficiently high temperature.

Specifically, the total heat Q that the stirling engine 110 can give to the heat medium is constant and is proportional to the product of the flow rate M of the heat medium and a temperature difference dT. When the temperature of the heat medium is low and the flow rate of the heat medium is high, the temperature of the heat medium supplied to the hot water tank 300 is likely to be lower than a preset temperature of the hot water stored in the hot water tank 300.

In this case, the auxiliary boiler 200 needs to be additionally operated so that the temperature of the water stored in the hot water tank 300 can reach the predetermined temperature. However, this may lower energy efficiency.

To this end, a circulation pump 170 is disposed between the return line heat exchanger 150 and the stirling engine 110, and the circulation pump 170 is used to adjust the flow rate of the heat medium that circulates. By lowering the flow rate of the circulating heat medium using the circulation pump 170, it is possible to sufficiently increase the temperature of the heat medium that exits the stirling engine 110.

Meanwhile, although the flow rate of the heat medium is controlled to be sufficiently low by using the circulation pump 170, since the sensible heat exchanger and the latent heat exchanger of the auxiliary boiler 200 deprives the heat medium, which gains heat by undergoing heat exchange with the stirling engine 110, of a considerable amount of the heat, it is possible to prevent the heat medium supplied to the hot water tank 300 from being abruptly over-heated. Therefore, it is possible to prevent inconvenience that may be caused to users of hot water.

A flow sensor 180 is disposed on the direct water line 140 to sense the flow rate of direct water supplied to the hot water tank 300. Therefore, it is possible to detect the use of hot water by sensing the flow rate of direct water by using the flow sensor 180. When the use of hot water is detected, the temperature sensor (310) provided to the hot water tank 300 senses the temperature of hot water stored in the hot water tank 300. At this point, when the sensed temperature is lower than a predetermined temperature, the stirling engine 110 is operated or both of the stirling engine 110 and the auxiliary boiler 220 are operated.

Regarding this case, a hot water temperature control method for a micro-CHP generator according to one embodiment of the present invention will be described below.

Figure 5:
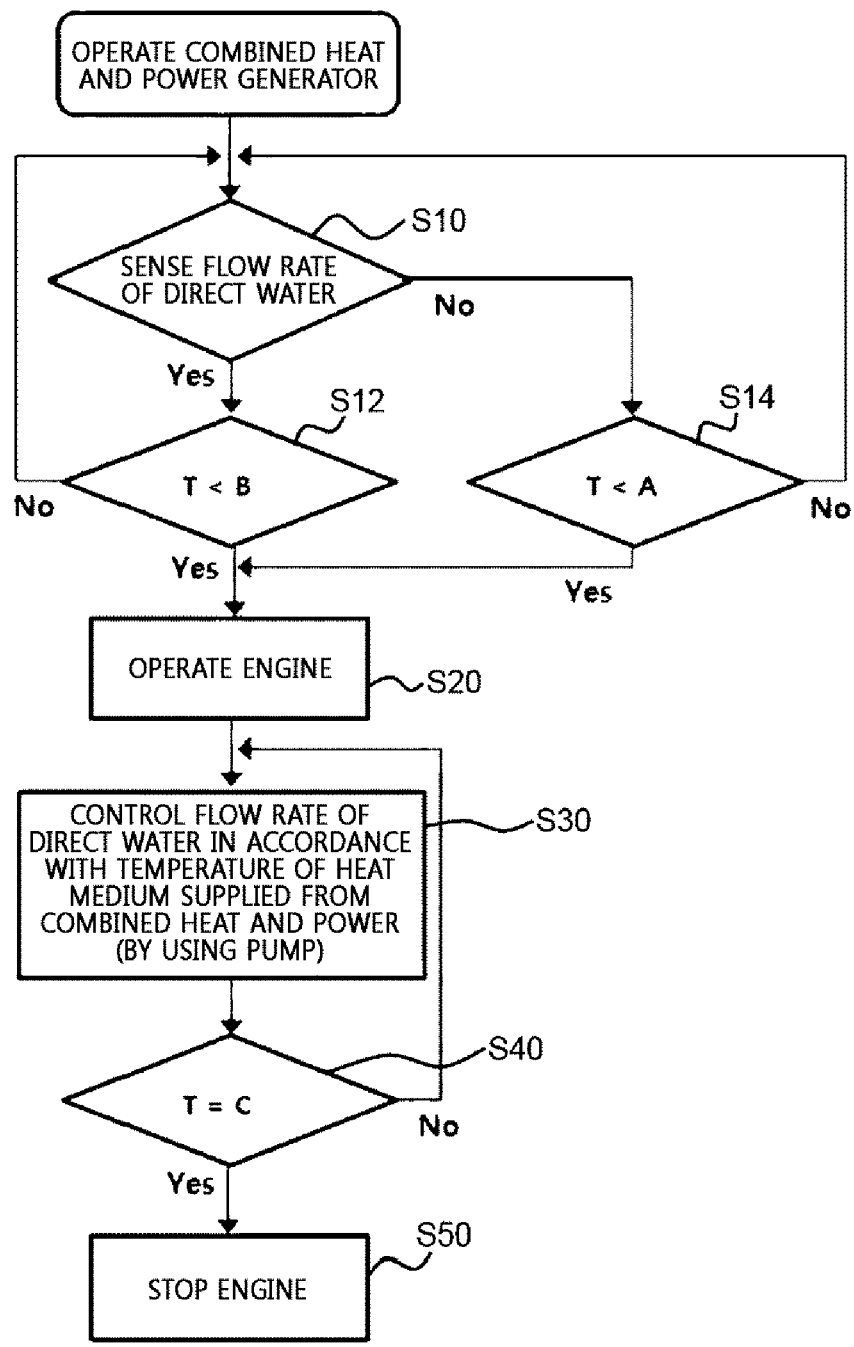
FIG. 5 is a flowchart illustrating a hot water temperature control method for a micro-CHP generator according to one embodiment of the present invention.

As illustrated in FIG. 5, in order to determine whether the hot water is consumed during operation of the micro-CHP generator, the flow rate of direct water introduced into the hot water tank 300 is sensed by a flow sensor 180 (Step S10).

A first predetermined temperature A is a temperature below that the stirling engine 110 needs to be operated in the case in which the temperature T of the hot water is lowered due to natural radiation.

A second predetermined temperature B is a temperature below which the stirling engine 110 needs to be operated in the case in which the temperature T of the hot water is lowered due to the supply of low-temperature direct water to the hot water tank attributable to the consumption of the hot water. To supply hot water with a predetermined stable temperature to a user, the second predetermined temperature B may be set to be higher than the first predetermined temperature A.

Specifically, the consumption of the hot water can be detected by using the flow sensor 180, it is possible to set the first and second predetermined temperatures A and B for the purpose of operating the stirling engine respectively in the case in which the hot water is cooled due to natural radiation and in the case in which the hot water is cooled due to the consumption of the hot water. As to the first predetermined temperature A set for natural radiation, for this case, a user is not in immediate need of hot water. Therefore, in this case, the hot water needs not be maintained at a high temperature in terms of energy efficiency. Therefore, the first predetermined temperature A is relatively low.

When the flow sensor 180 indicates that the hot water is consumed, it is determined whether the temperature T of the hot water stored in the hot water tank 300 is lower than the second predetermined temperature B (Step S12).

On the contrary, when the flow sensor 180 indicates that the hot water is not consumed, it is determined whether the temperature T of the hot water stored in the hot water tank 300 is lower than the first predetermined temperature A (Step S14)

When the temperature T of the hot water is lower than the second predetermined temperature B in Step S12 or the first predetermined temperature A in Step S14, the stirling engine 110 is operated (Step S20).

In this case, the circulation flow rate M of the heat medium is controlled by using the circulation pump (170) so that the temperature of the heat medium supplied from the stirling engine 110 may be high (Step S30).

Subsequently, when the temperature T of the hot water is equal to or higher than a third predetermined temperature C at which the stirling engine 110 needs to stop operating (Step S40), the operation of the stirling engine 110 that has been operated since Step S20 is stopped (Step S50).

The third predetermined temperature C may be set to a sufficiently high temperature to prevent the frequent operation stops and resumptions of the stirling engine 110, thereby preventing durability deterioration of the stirling engine 110.

Embodiments of a heat medium circulation structure and a hot water temperature control method for a micro-combined heat and power generator according to the present invention are provided for only an illustrative purpose, but those skilled in the art will appreciate that various alternatives, modifications, and equivalents are possible. Therefore, it can be understood that the present invention is not limited only to the forms described in the detailed description. Accordingly, the substantial technical protection scope of the present invention should be defined on the basis of the technical spirit of the appended claims. In addition, the present invention should be construed to include all alternatives, modifications, equivalents, and substitutions within the spirit and scope defined in the appended claims.

DESCRIPTION OF THE REFERENCE NUMERALS IN THE DRAWINGS

100: Housing
110: Stirling engine
120: Engine burner
130: Heat medium return line
140: Direct water line
150: Return line heat exchanger
160: Heat medium supply line
170: Circulation pump
180: Flow sensor
200: Auxiliary boiler
210: Sensible heat exchanger
215: Auxiliary burner
220: Latent heat exchanger
230: Casing
250: Connection pipe
300: Hot water tank
310: Temperature sensor

The invention claimed is:

1. A heat medium circulation structure for a micro-combined heat and power (micro-CHP) generator, the structure comprising:
a stirling engine that produces electricity using a temperature difference between a temperature of an engine head which is heated by an engine burner and a temperature of a heat medium which returns from a hot water tank through a heat medium return line, wherein the engine head temperature is higher than the heat medium temperature;
a sensible heat exchanger disposed at one side of the stirling engine;
the hot water tank that receives the heat medium which is heated to a temperature by the stirling engine and the sensible heat exchanger and is then supplied thereto through a heat medium supply line, and allows the heated heat medium to perform heat-exchange with water stored therein, wherein the temperature of the heated heat medium supplied to the hot water tank is higher than the temperature of the heat medium returned from the hot water tank;
a direct water line through which direct water is supplied to the hot water tank to replenish the water stored in the hot water tank so that the hot water tank maintains a predetermined water level; and
a return line heat exchanger installed at the direct water line and before the hot water tank so that the direct water can perform heat exchange with the heat medium in the heat medium return line before being supplied to the hot water tank.

2. The heat medium circulation structure according to claim 1, further comprising: a latent heat exchanger disposed at the one side of the stirling engine, wherein the hot water tank receives the heated heat medium that is heated by passing the stirling engine, the sensible heat exchanger, and the latent heat exchanger, and allows the heated heat medium to undergo heat exchange with the water stored therein.

3. The heat medium circulation structure according to claim 1, further comprising: a circulation pump disposed between the return line heat exchanger and the stirling engine to adjust a flow rate of the heat medium that circulates and performs heat exchange with the direct water, in the return line heat exchanger, thereby adjusting the temperature of the heat medium supplied from the stirling engine.

4. A hot water temperature control method for a micro-combined heat and power generator, the method comprising:
a step of determining whether hot water is consumed by sensing a flow rate of direct water introduced into a hot water tank through a direct water line, using a flow sensor installed at one side of the direct water line, during operation of the micro-combined heat and power generator;

a step (S12) of determining whether a temperature of the hot water stored in the hot water tank is lower than a first predetermined temperature so as to operate a stirling engine in case the temperature of the hot water drops due to consumption of the hot water, when it is determined that the hot water is consumed in the determining step;

a step of determining whether the temperature of the hot water stored in the hot water tank is lower than a second predetermined temperature so as to operate the stirling engine in case the temperature of the hot water drops due to natural radiation, when it is determined that the hot water is not consumed in the determining step;

a step of operating the stirling engine when it is determined that the temperature of the hot water is lower than the first predetermined temperature or the second predetermined temperature;

a step of adjusting a temperature of the heat medium supplied from the stirling engine by adjusting a flow rate of the heat medium using a circulation pump;

a step of determining whether the temperature of the hot water is lower than a third predetermined temperature at which the stirling engine needs to stop operating; and a step of stopping the stirling engine that is operated in the operating step when it is determined that the temperature of the hot water is equal to or higher than the third predetermined temperature.

* * * * *